United States Patent [19]
Yeh et al.

[11] Patent Number: 6,068,667
[45] Date of Patent: May 30, 2000

[54] MIXTURES OF SYMMETRICAL AND UNSYMMETRICAL RED REACTIVE DYES

[75] Inventors: Ming-Mei Yeh, Taoyuan Hsien; Ting-Jui Chang, Taitung Hsien; Sheena Lee; Da-Jong Yin, both of Taipei, all of Taiwan

[73] Assignee: Everlight USA, Inc., Pineville, N.C.

[21] Appl. No.: 09/305,300

[22] Filed: May 5, 1999

[51] Int. Cl.$^7$ .......................... C09B 67/00; D06P 1/382; D06P 3/66

[52] U.S. Cl. .......................... 8/549; 8/543; 8/641; 8/918; 8/924; 534/634

[58] Field of Search .......................... 8/549, 641; 534/634

[56] References Cited

U.S. PATENT DOCUMENTS 3,647,778  3/1972  Andrew et al. .
5,232,462  8/1993  Tzikas .
5,928,387  7/1999  Ruhlmann et al. .

FOREIGN PATENT DOCUMENTS 2611550   9/1976   Germany .
1529645  10/1978   United Kingdom .

*Primary Examiner*—Margaret Einsmann
*Attorney, Agent, or Firm*—Bacon & Thomas

[57] ABSTRACT

The present invention relates to novel, three component, mixtures comprising red reactive dyes which in the free acid forms are represented by the formula (I), (II) and (II'), a) a red reactive dye of formula (I)

b) a reactive red dye of the formula (II)

c) a reactive red dye of the formula (II')

where the variables are as described in the claims. The mixtures are suitable for dyeing and printing cellulose containing fibre materials and produce dyeings and prints which exhibit good build up and fastness properties.

17 Claims, No Drawings

MIXTURES OF SYMMETRICAL AND UNSYMMETRICAL RED REACTIVE DYES

FIELD OF THE INVENTION

The preparation of novel, three component, mixtures of red reactive dyestuffs and a process for their application to cellulose textiles.

SUMMARY OF THE INVENTION

The present invention relates to novel mixtures of reactive red dyes comprising three components, which in the free acid form, may be represented by the following formula, a) a reactive red dye of the formula (I)

a) a red reactive dye of formula (I)

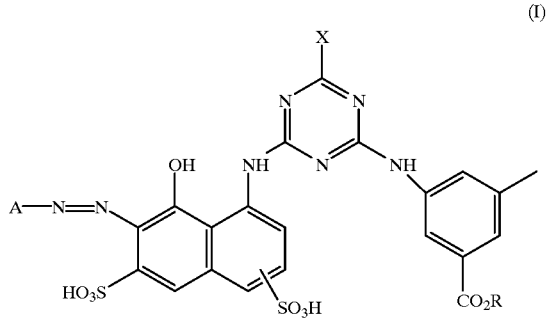

(I)

b) a reactive red dye of the formula (II)

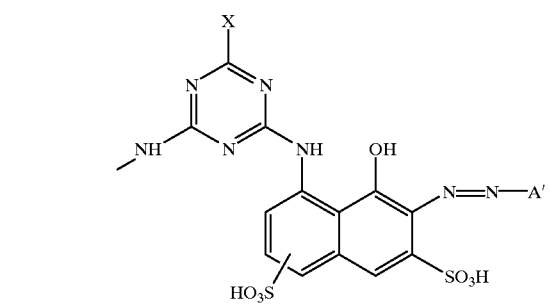

(II)

c) a reactive red dye of the formula (II')

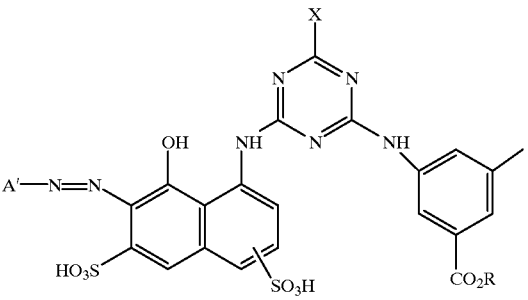

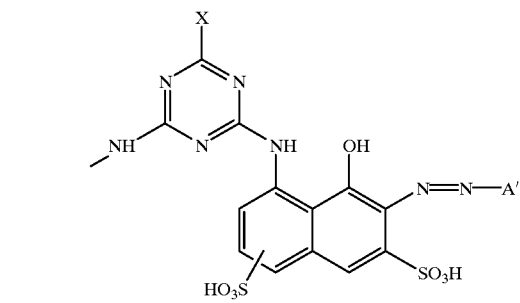

(II')

in each of the formula (I), (II) and (II')

R is a hydrogen atom or $C_{1-4}$ alkyl;

X is a fluorine, chlorine or bromine atom;

A and A' are different and each is independently a phenyl or naphthyl group, which may be unsubstituted or substituted by one or more groups selected from $C_{1-4}$ alkyl, $C_{1-4}$ alkoxyl or —$SO_2Q$ where Q is —OH, $CH=CH_2$, —$C_2H_4OSO_3H$ or —$C_2H_4Cl$.

In each of the compounds of formula (I), (II) and (II') of the present invention, both of the groups A and A' can be substituted or unsubstituted.

When A or A' is substituted phenyl, it is preferred that A or A' is a substituted phenyl sulphonic acid as below,

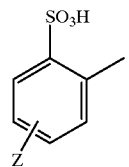

wherein, Z is H, $C_{1-4}$ alkyl, $C_{1-4}$ alkoxyl or —$SO_2Q$ where Q is —OH, —$CH=CH_2$, —$C_2H_4OSO_3H$ or —$C_2H_4Cl$.

When A or A' is substituted naphthyl, it is preferred that the azo group is in the 2-position of the naphthalene nucleus and that the 1-position of the naphthalene is substituted by a sulphonic acid residue as below,

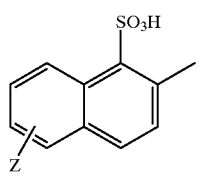

wherein, Z is H, $C_{1-4}$ alkyl, $C_{1-4}$ alkoxyl or —$SO_2Q$ where Q is —OH, —$CH=CH_2$, —$C_2H_4OSO_3H$ or —$C_2H_4Cl$.

Compositions containing various percentages of dyes of the present invention can be obtained directly by varying the molar ratios of the reactants during manufacture. Furthermore, materials with good dyeing properties and with various red colour tones, depending on ratio percentage of the individual reactive red dyes in the compositions, can be obtained.

The present invention also relates to the preparation, and use as a reactive dye, of a compound of formula (I), alone, as well as in admixture with compounds of formula (II) and (II'), for dyeing and printing cellulose containing fibres.

Dye mixtures comprising reactive dyes of the formula (I), (II) and (II') give dyeings having outstanding technical properties, in particular good wash-off, wet fastness and dyeing properties.

By preparing mixtures in which the reactive red dyestuffs of the present invention are combined in different ratios dyed materials with outstanding wash off, level dyeing and wash fastness properties can be obtained.

DESCRIPTION OF THE PREFERRED EMBODIMENTS

Compositions of the present invention can be synthesized by the following method.

The process for preparing dye compositions of the present invention is very special. The desired compositions containing reactive red dyes of the present invention can be obtained directly by using designed quantities of starting materials during the reaction steps. In most known manufacturing processes of dye compositions containing mixtures of dyes, the individual components of dye mixtures are synthesized individually first, then subsequently mixed together in the required ratios. However, the process used to produce dye mixtures of the present invention is totally different from these known processes. Additionally the greater solubility of dye mixtures of the present invention, relative to that of the individual components, allows the use of more concentrated reaction mixtures leading to more productive processes.

First, 1-amino-8-hydroxynaphthalenedisulphonic acid is dissolved in neutral aqueous solution then reacted with a trihalogenotriazine of formula (a),

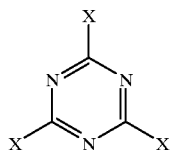

(a)

wherein each X is a fluorine, chlorine or bromine atom.

The reaction is carried out by stirring the mixture of starting materials, at a temperature between 0~30° C., preferably below 20° C., and the pH is allowed to fall to below pH3 whereupon the intermediate (b) having the structure depicted below, is obtained.

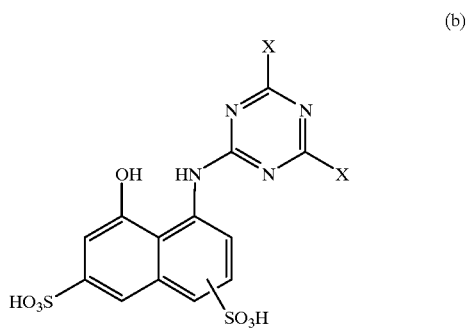

(b)

X has the same definition as above.

Then a mixture of the diazonium salts $A-N_2^+$ and $A'-N_2^+$ was prepared by diazotisation of a mixture of amines $A-NH_2$ and $A'-NH_2$, is allowed to react with compound (b), to yield a solution containing a mixture of intermediate (c) and intermediate (d).

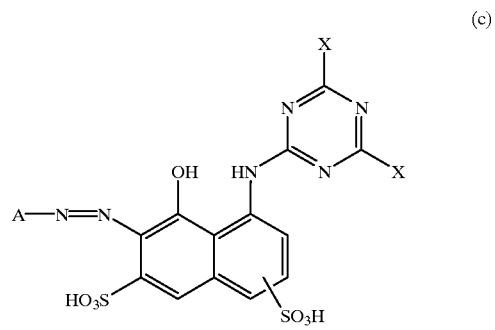

(c)

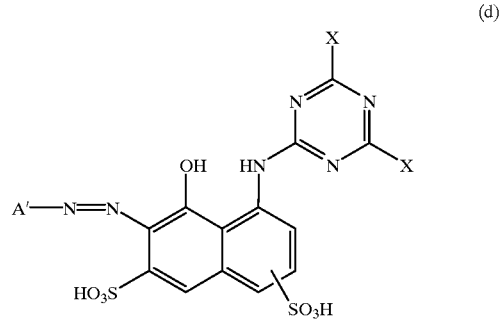

(d)

wherein, X, A, and A' are defined as above.

Preferred examples of $A-NH_2$ and $A'-NH_2$ include 4(2-sulphatoethylsulphonyl-) aniline, 3(2-sulphatoethylsulphonyl-)aniline, 2-amino-5-(2-sulphatoethylsulphonyl-)benzenesulphonic acid, 2-amino-4-(2-sulphatoethylsulphonyl-)benzenesulphonic acid,3-aminobenzenesulphonic acid, 4-amino benzenesulphonic acid, 2-aminobenzenesulphonic acid, 6-aminobenzene-1,3-disulphonic acid, 6-aminobenzene-1,4-disulphonic acid, 2-amino-5-methylbenzenesulphonic acid, 2-amino-4-methylbenzenesulphonic acid, 2-amino-5-methoxybenzenesulphonic acid, 2-amino-5-nitrobenzenesulphonic acid, 2-amino-5-nitrobenzenesulphonic acid, 2-aminonaphthalene-1-sulphonic acid; 2-aminonaphthalene-1,5-disulphonic acid, 2-amino-5-(2-sulphatoethylsulphonyl-) naphthalene-1-sulphonic acid and 2-amino-6-(2-sulphatoethylsulphonyl-) naphthalene-1-sulphonic acid.

The mixture of intermediate (c) and intermediate (d) is then reacted with 3,5-diaminobenzoic acid or methyl 3,5- diaminobenzoate. During the reaction, the pH is controlled by the use of an acid binder. The reactive red dyestuff of the present invention of formula (I) is then obtained, together with dyestuffs of formula (II) and (II'). The temperature is maintained at between 20–80° C., preferably 30–50° C. The pH is maintained in between 5 to 9, preferably 6 to 7. Suitable acid binders include alkali metal hydroxides, carbonates or hydrogen carbonates. Especially valuable are the carbonates or hydrogen carbonates of sodium, potassium and lithium. The carbonate or hydrogen carbonate of sodium is especially preferred.

The resulting solution contains a compound of formula (I), a compound of formula (II) and a compound of formula (II')

1 molar equivalent of 3,5-diaminobenzoic acid or methyl-3,5-diaminobenzoate, and then the resulting product is further reacted with a molar equivalent of the other dichlorotriazine (d) to give the unsymmetrical product represented by the formula (I).

Mixing the different compounds of formula (I), (II) and (II') in different ratios yields reactive red dyestuff mixtures which produce dyeings of excellent quality. The ratio of each dye component can be varied over a wide range. In general, the minimum relative percentage by weight of each dye component is 1%, and the maximum percentage by weight is 85%.

The dyestuffs of the present invention can be used in the form of powders, grains, particles or liquids which may also

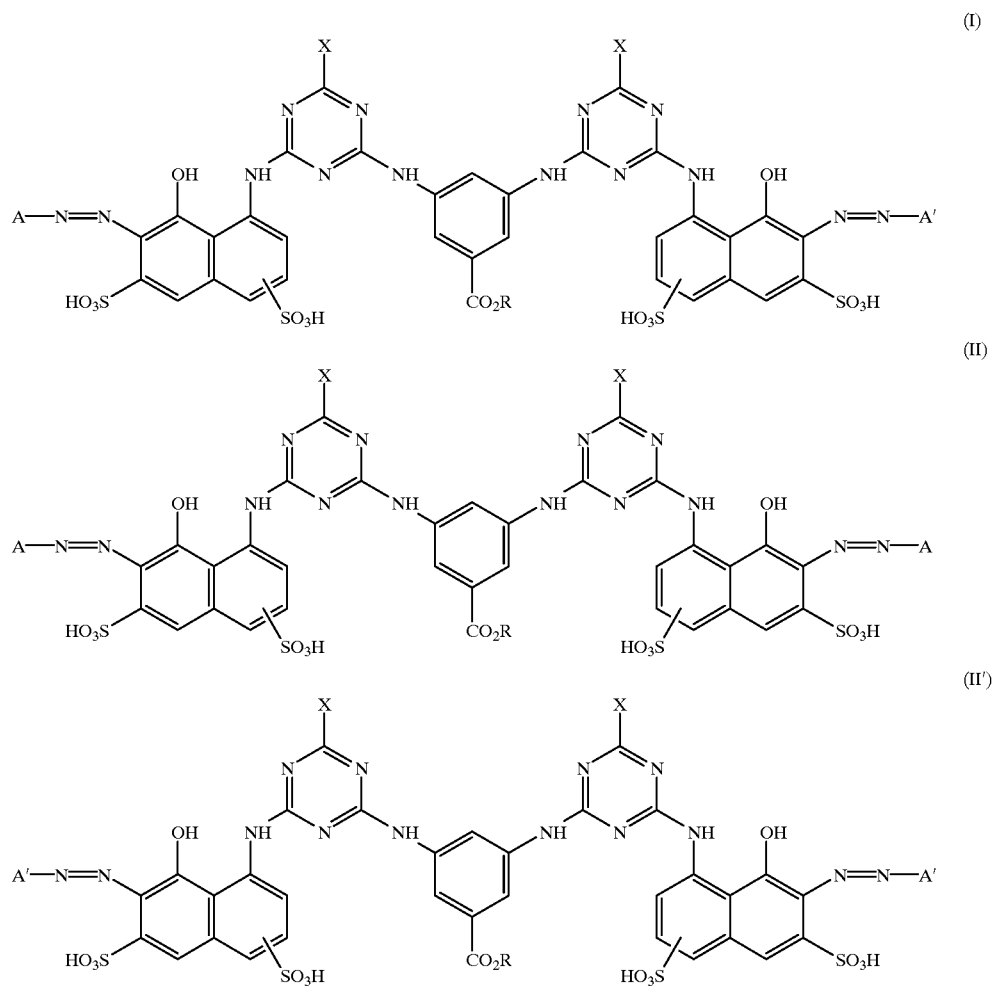

wherein, X, R, A, and A' have the same definition as above.

The dyestuff mixtures of the present invention can be made by the method described above. The reaction conditions have been described thoroughly in the previous illustration. By appropriate choice of the quantities of compounds of formula (c) and (d) it is possible to obtain a mixture in which the major product is the unsymmetrical red reactive dye of formula (I) which can be purified using known methods, such as selective precipitation in presence of added electrolyte. Also the compound of formula (I) can be obtained in a two stage process in which the dichlorotriazine (c) is reacted at low pH, and at 20° C. to 40° C., with contain retarding agents, surfactants, dispersing agents or other auxiliary agents.

The dyestuff mixtures of the present invention all contain anionic groups, such as sulphonic acid groups. For convenience they are depicted here in the free acid form but under usual conditions will be present in the form of salts. When the dyestuffs of the present invention are manufactured, purified or used, they exist in the form of water soluble salts, especially alkaline metal salts, such as sodium, potassium or ammonium salts.

The reactive red dyestuffs mixture of the present invention, comprising dyes of formula (I), (II) and (II'), and also the unsymmetrical dye of formula (I), can be used to dye natural or synthetic yarn, woven or knitted fabrics that contain amide groups, such as wool, silk or polyamide. They are especially suitable for dyeing or printing hydroxyl containing fibres such as and natural or reconstituted cellulose fibres such as cotton, linen, viscose and lyocel fibres. They are also suitable for the dyeing of blends of these fibres with synthetic fibres such as polyester or polyacrylonitrile. The dyeing methods used are those generally used when applying reactive dyestuffs. Dyeing cellulose fibre, for example, the dyeing process is carried out with the assistance of acid-binding agents such as sodium hydroxide, sodium phosphate, sodium carbonate or sodium bicarbonate before, during or after dyeing; auxiliary agents can also be used as required.

More detailed examples are used to illustrate and explain the present invention. The examples below, which are given simply by way of illustration, must not be taken to limit the scope of the invention.

In the examples, compounds of the present invention are depicted as free acids, but their actual form can be that of metallic salts, or more possibly alkali metal salts, especially sodium salts.

EXAMPLE 1

An ice cold neutral solution of 1-hydroxy-8-aminonaphthalene-3,6-disulphonic acid (31.9 parts) in water (120 parts) was added, with stirring, to a freshly prepared suspension of 2,4,6-trichloro-s-triazine (18.5 parts) in ice and water (140 parts). The mixture was stirred for 3 hours at 0 to 5° C. to give a solution of 1-hydroxy-8-(2,4-dichloro-s-triazin-6-ylamino-)naphthalene-3,6-disulphonic acid (solution 1).

At the same time a mixture of 2-sulphobenzendiazonium chloride and 1,5-disulphonaphthalene-2-diazonium chloride was prepared by diazotising a mixture of 2-aminobenzenesulphonic acid (1.7 parts) and 2-aminonaphthalene-1,5-disulphonic acid (27.3 parts) with nitrous acid. Solution 1 was added to this mixture of diazonium salts, the pH was raised to between 6 and 7 and the mixture was stirred for 3 hours, at pH 6 to 7, and at less than 10° C., after which time coupling was essentially complete. 3,5-Diaminobenzoic acid (7.6 parts) was added and the mixture was stirred at 30 to 40° C. and at pH 6 to 7 to give a mixture of compounds (I-1), (II-1) and (II-2), λmax=524.5 nm. The ratio of each component, determined by HPLC, was as follows; formula (I-1) 20.92%; formula (II-1) 78.00%; and formula (II-2) 1.07%. After drying, a red powder was obtained which dyed cotton in a deep red shade with excellent fastness properties.

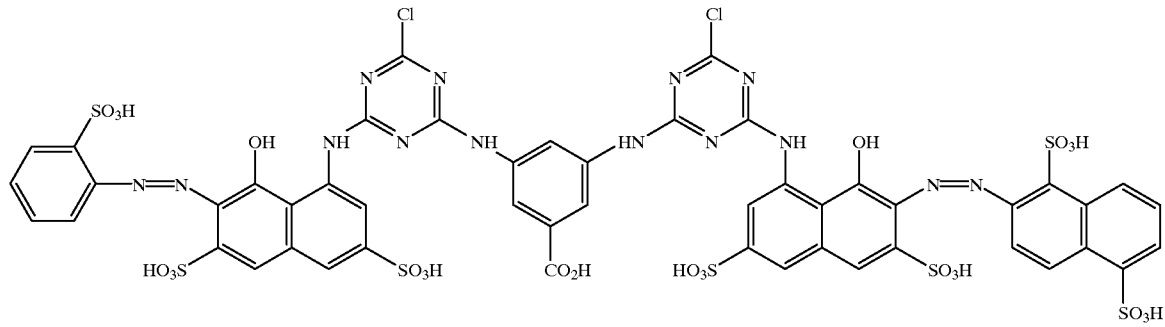

(I-1)

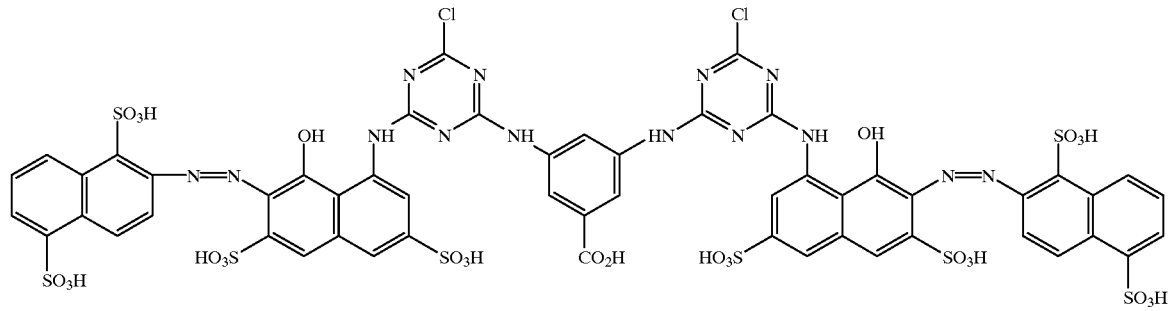

(II-1)

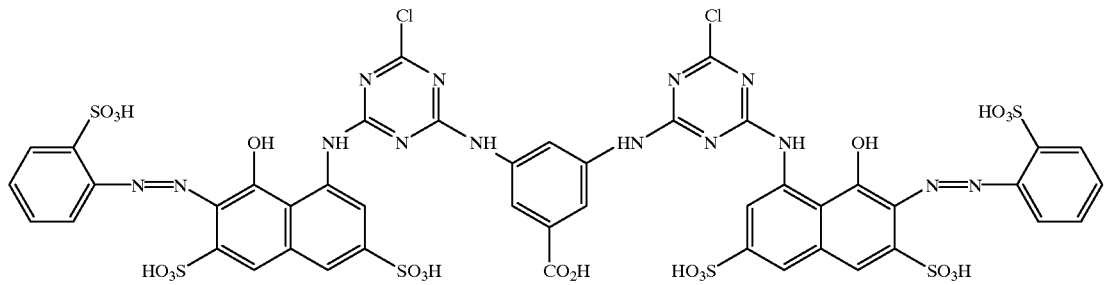

(II-2)

EXAMPLE 2

A cold solution of 1-hydroxy-8-(2,4-dichloro-s-triazin-6-ylamino-)naphthalene-3,6-disulphonic acid was prepared as described above (solution 1).

At the same time a mixture of 2-sulphobenzendiazonium chloride and 1,5-disulphonaphthalene-2-diazonium chloride was prepared by diazotising a mixture of 2-aminobenzenesulphonic acid (2.9 parts) and 2-aminonaphthalene-1,5-disulphonic acid (25.3 parts) with nitrous acid. Solution 1 was added to this mixture of diazonium salts, the pH was raised to between 6 and 7 and the mixture was stirred for 3 hours, at pH 6 to 7, and at less than 10° C., after which time coupling was essentially complete. 3,5-Diaminobenzoic acid (7.6 parts) was added and the mixture was stirred at 30 to 40° C. and at pH 6 to 7 to give a mixture of compounds (I-1), (II-1) and (II-2), $\lambda$max=524.5 nm. The ratio of components, determined by HPLC was compound (I-1) 26.34%; compound(II-1)69.22% and compound (II-2)4.44%. A red powder was obtained by spray drying. The dyestuff mixture dyed cotton a deep red shade with good build up and excellent properties.

EXAMPLE 3

A solution (solution 1) of 1-hydroxy-8-(2,4-dichloro-s-triazin-6-ylamino-) naphthalene-3,6-disulphonic acid was prepared as described in Example 1 above.

At the same time a mixture of 2-sulphobenzendiazonium chloride and 1,5-disulphonaphthalene-2-diazonium chloride was prepared by diazotising a mixture of 2-aminobenzenesulphonic acid (8.7 parts) and 2-aminonaphthalene-1,5-disulphonic acid (15.2 parts) with nitrous acid. Solution 1 was added to this mixture of diazonium salts, the pH was raised in between 6 and 7 and the mixture was stirred for 3 hours, at pH 6 to 7, and at less than 10° C., after which time coupling was essentially complete. 3,5-Diaminobenzoic acid (7.6 parts) was added and the mixture was stirred at 30 to 40° C. and at pH 6 to 7 to give a mixture of compounds (I-1), (II-1) and (II-2), $\lambda$max=520.0 nm. The ratio of components, which was determined by HPLC was compound (I-1) 51.48%; compound (II-1) 19.29% and compound(II-2) 29.43%. A red powder was obtained by spray drying. The dyestuff mixture was used to dye a piece of knitted cotton a deep red shade; the dyeings thus obtained exhibited excellent fastness properties.

EXAMPLE 4

A solution of 1-hydroxy-8-(2,4-dichloro-s-triazin-6-ylamino-)naphthalene-3,6-disulphonic acid (solution 1) was prepared as described in Example 1.

At the same time a mixture of 2-sulphobenzendiazonium chloride and 1,5-disulphonaphthalene-2-diazonium chloride was prepared by diazotising a mixture of 2-aminobenzenesulphonic acid (13.8 parts) and 2-aminonaphthalene-1,5-disulphonic acid (6.1 parts) with nitrous acid. Solution 1 was added to this mixture of diazonium salts, the pH was raised in between 6 and 7 and the mixture was stirred for 3 hours, at pH 6 to 7, and at less than 10° C., after which time coupling was essentially complete. 3,5-Diaminobenzoic acid (7.6 parts) was added and the mixture was stirred at 30 to 40° C. and at pH 6 to 7 to give a mixture of compounds (I-1), (II-1) and (II-2), $\lambda$max=514.5 nm. The ratio of components, which was determined by HPLC was as follows; compound (I-1) 22.63%; compound (II-1) 4.26% and compound (II-2) 73.67%. A red powder was obtained on spray drying. The dyestuff mixture was used to dye cotton fabric in a deep red shade with excellent properties.

EXAMPLE 5

A mixture of 2-sulphobenzendiazonium chloride and 1,5-disulphonaphthalene-2-diazonium chloride was prepared by diazotising a mixture of 2-aminobenzenesulphonic acid (2.9 parts) and 2-aminonaphthalene-1,5-disulphonic acid (25.3.parts) with nitrous acid. A solution of 1-hydroxy-8-(2, 4-dichloro-s-triazin-6-ylamino-)naphthalene-3,6-disulphonic acid, prepared from 1-hydroxy-8-aminonaphthalene- 3,6-disulphonic acid (31.9 parts) as described in Example 1, was added to this mixture of diazonium salts, the pH was raised in between 6 and 7 and the mixture was stirred for 3 hours, at pH 6 to 7, and at less than 10° C., after which time coupling was essentially complete. Methyl-3,5-diaminobenzoate (8.3 parts) was added and the mixture was stirred at 30 to 40° C. and at pH 6 to 7 to give a mixture of compounds (I-2), (II-3) and (II-4), $\lambda$max=519.5 nm. The ratio of components, which was determined by HPLC was compound (I-2) 30.75%; compound(II-3) 64.16% and compound(II-4) 5.08%. A red powder was obtained through spray drying which, under the usual dyeing procedure, furnished red dyeings with good fastness properties.

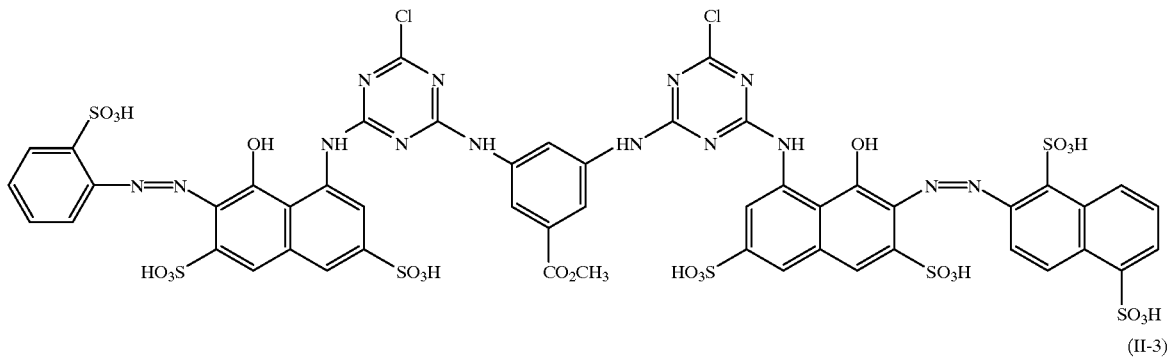

(I-2)

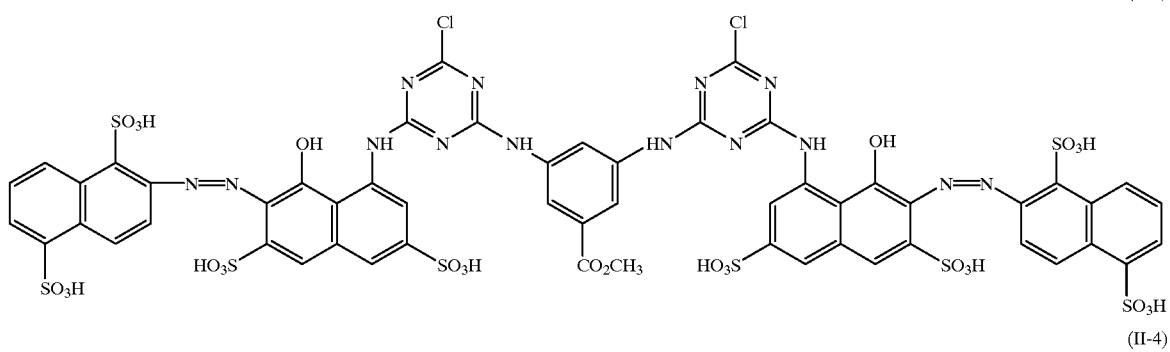

(II-3)

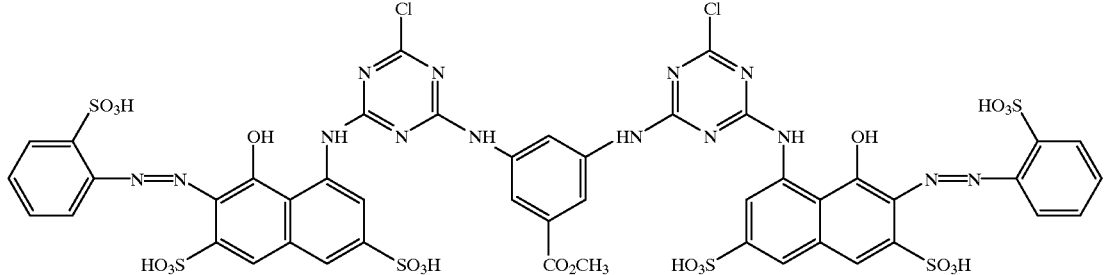

(II-4)

EXAMPLE 6

Using the procedure described in Example 3 a red dyestuff mixture consisting dyes of formula (I-1), formula (II-1) and formula (II-2) was obtained. This mixture was separated by known procedures. A reactive red dye of formula (I-1) was obtained. This material exhibited excellent build-up and fastness properties when applied to woven cotton fabric.

EXAMPLE 7

A procedure similar to that of Example 5 was employed to obtain a red dyestuff of formula (I-2), formula (II-3) and formula (II-4). Then the composition was further separated by known procedures. A reactive red dye of formula (I-2) was thus obtained. This yielded red dyeings with excellent build-up on knitted cotton fabric.

Dye testing:

The following procedure was used.

a. Separately take one part of the above dyestuffs (Examples 1 to 7) and dissolve in 1000 parts of distilled water to give a solution of dye.

b. Then take two dyeing bottles washed with distilled water and put aliquots of dyeing solution, 40 parts and 80 parts, into the bottles, finally add 4.8 parts Glauber's salt to each bottle.

c. Add distilled water to each bottle up to a total of 85 parts by volume.

d. Add 5 parts of pure base solution (320 g/l) to each bottle.

e. Place two parts of prewetted full cotton woven fabric into each dyeing bottle. The top of the bottle was covered with a lid and shaken thoroughly.

f. Put the dyeing bottle into a thermobath, heat up to 80° C. over 5 minutes and keep at the same temperature for 60 minutes. The fabric is taken out and washed with cold water, then put into a big stainless bucket and washed with hot water for 10 minutes. Then the fabric is put into another big stainless steel bucket with 2 g/l soaping agent, and washed with boiling water for 10 minutes.

g. The fabric is taken out, washed with cold water, then dried.

The reactive red dyestuffs or dye mixtures of the present invention can be used to dye yarn, woven or knitted fabrics that contain amide groups, such as wool, silk or polyamide. They can also be used to dye cellulosic fibres like cotton, linen or reconstituted celluilose. They are especially suitable for dyeing or printing hydroxyl group containing yarn and fabrics, for example cotton and reconstituted cellulose. They can also be used for dyeing or printing blends of these fibres with synthetic fibres such as polyesters, polyacrylonitrile etc. The dyeing methods used are those generally employed when applying reactive dyestuffs. When dyeing cellulose fibre, for instance, the dyed material can be treated with acid binder solution such as sodium hydroxide, sodium phosphate, sodium carbonate or sodium bicarbonate before, during or after the application of dye. Required amounts of auxiliary reagents can also be used as required.

From the foregoing description, one skilled in the art can easily ascertain the essential characteristics of this invention, and without departing from the scope thereof, can make various changes and modifications of the invention to adapt it to various usages and conditions. Thus, other embodiments are also within the claims.

What is claimed is:

1. A red reactive dye mixture comprising three red reactive dyes which may be represented, in the free acid forms, by the formula (1), (II) and (II'), a) formula (I)

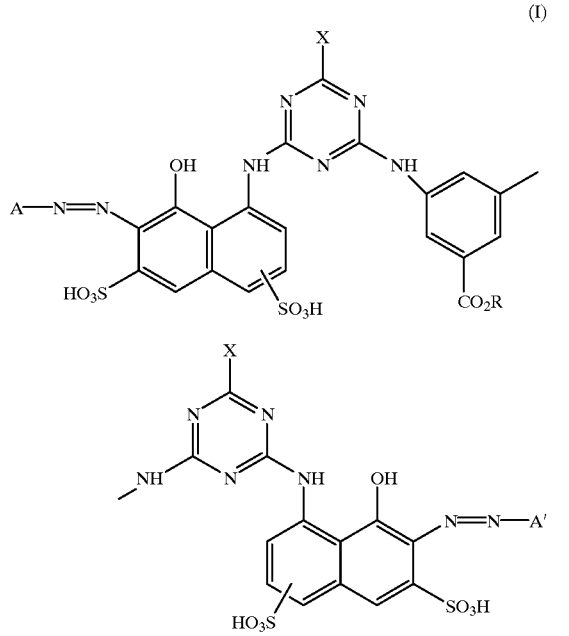

b) formula (II)

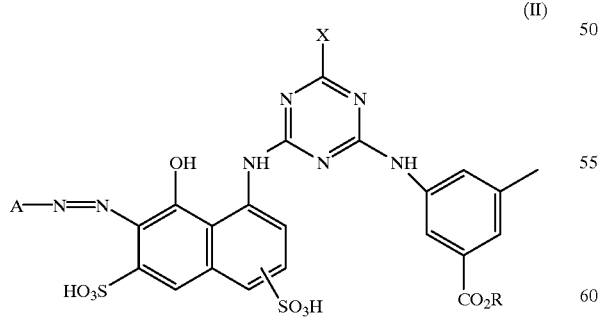

c) formula (II')

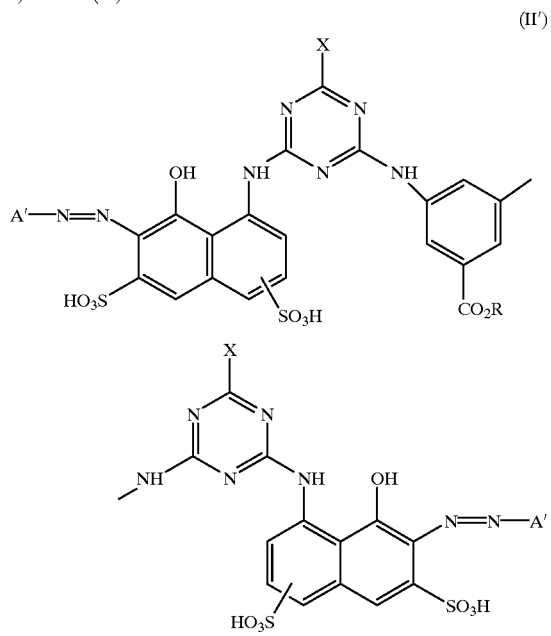

In each of the formula (I), (II) and (II')

R is a hydrogen atom or an alkyl group containing one to four carbon atoms;

X is a fluorine, chlorine or bromine atom;

A and A' are different and each is independently a phenyl or naphthyl group, which may be unsubstituted or substituted by one or more groups selected from, alkyl $C_{1-4}$, alkoxyl $C_{1-4}$ or —$SO_2Q$ where Q is —OH, —CH=$CH_2$, —$C_2H_4OSO_3H$ or —$C_2H_4Cl$.

2. A dyestuff mixture according to claim 1, wherein each X is a chlorine atom.

3. A dyestuff mixture according to claim 1, wherein A and A' are independently selected from either (i) a substituted phenyl sulphonic acid of the following structure,

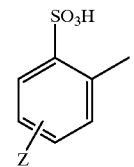

or (ii) a substituted naphthyl sulphonic acid of the following formula,

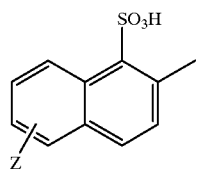

wherein Z is H, $C_{1-4}$ alkyl, $C_{1-4}$ alkoxyl or , —$SO_2Q$ where Q is —OH, —CH=$CH_2$, —$C_2H_4OSO_3H$ or —$C_2H_4Cl$.

4. A dyestuff mixtures according claim to 1, wherein A is the following substituted phenyl sulphonic acid,

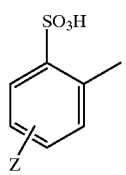

wherein Z is H, $C_{1-4}$ alkyl, $C_{1-4}$ alkoxyl or —$SO_2Q$ where Q is —OH —CH=$CH_2$, —$C_2H_4OSO_3H$ or —$C_2H_4Cl$; and A' is the following substituted naphthyl sulphonic acid,

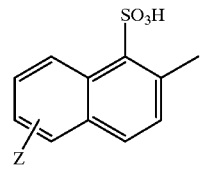

wherein Z is H, $C_{1-4}$ alkyl, $C_{1-4}$ alkoxyl or —$SO_2Q$ where Q is —OH, —CH=$CH_2$, —$C_2H_4OSO_3H$, or —$C_2H_4Cl$.

5. A dyestuff mixture according to claim 1, comprising three components, represented by the formula (I-1), (II-1) and (II-2) which are present in the ratios shown,

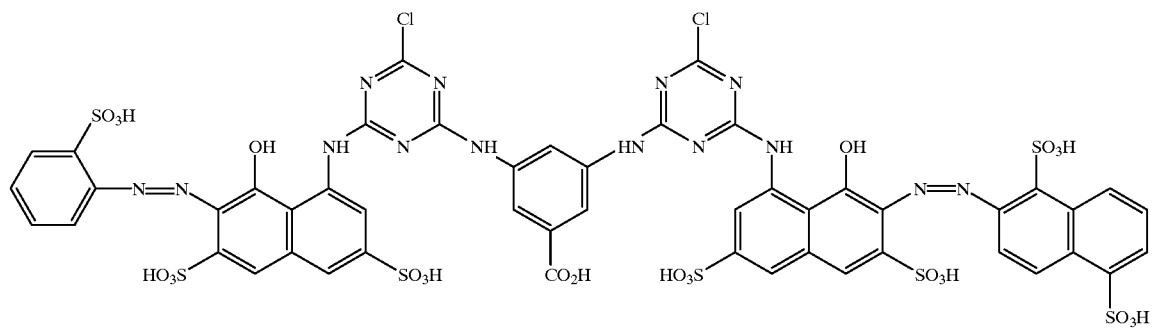
(I-1)

(I-1) is present in an amount representing 1% to 85% by weight of the total dye present,

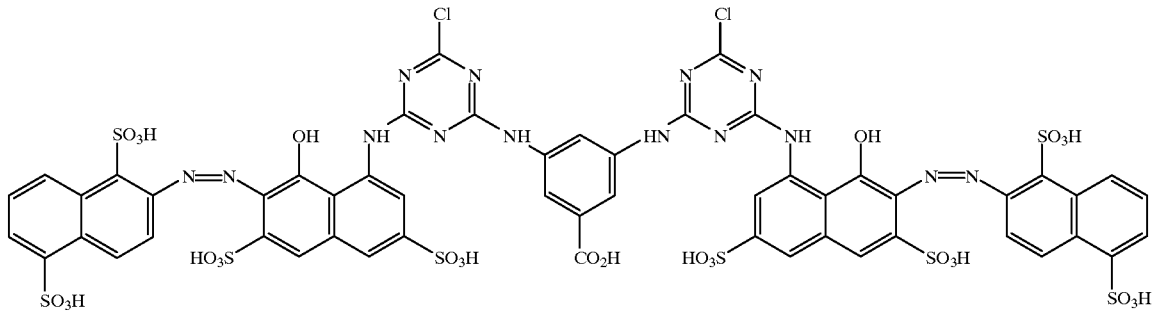
(II-1)

(II-1) is present in an amount representing 1% to 85% by weight,
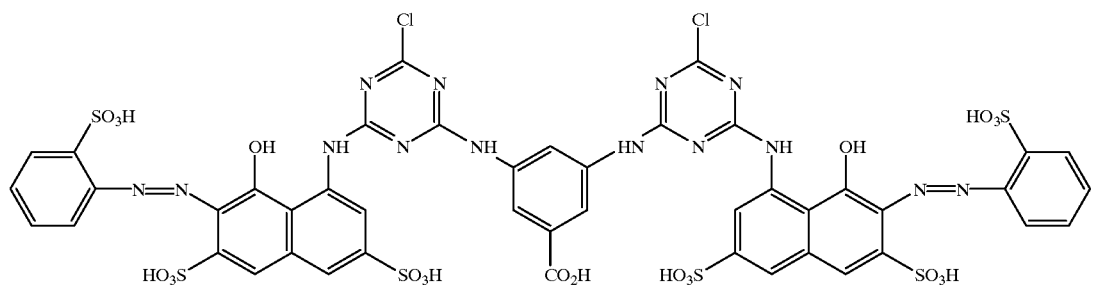
(II-2)
(II-2) is present in 1% to 85% by weight.
6. A dyestuff mixture according to claim 1, comprising three components represented by the formula (I-2), (II-3) and
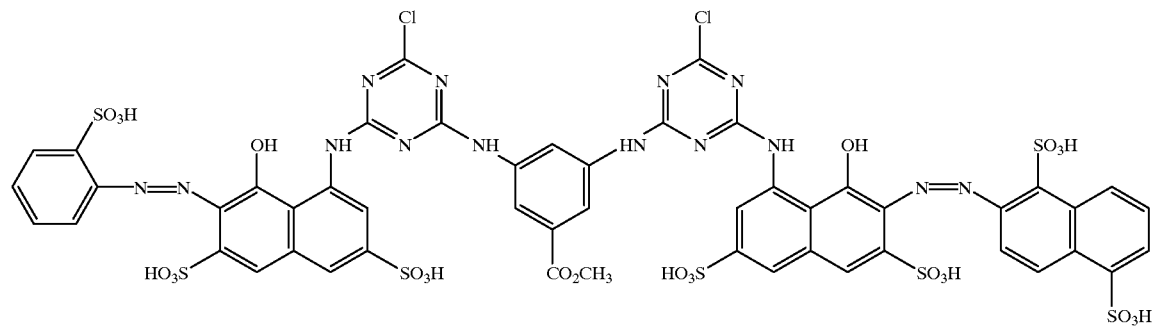
(I-2)
present in 1% to 85% by weight;
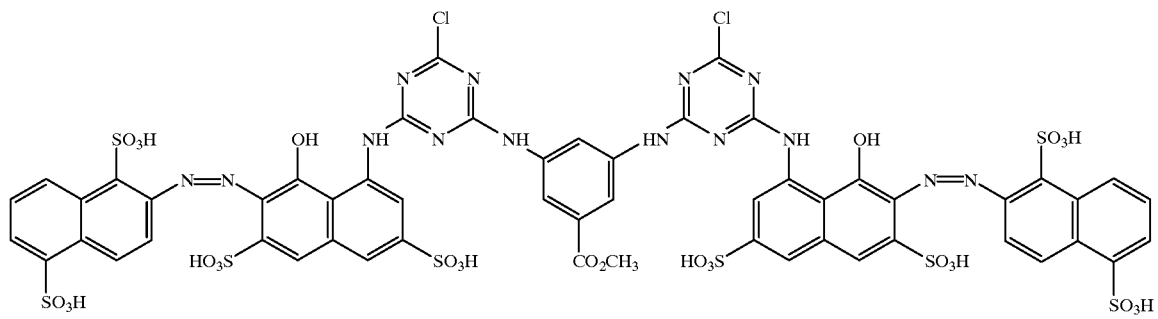
(II-3)

present in 1% to 85% by weight; and

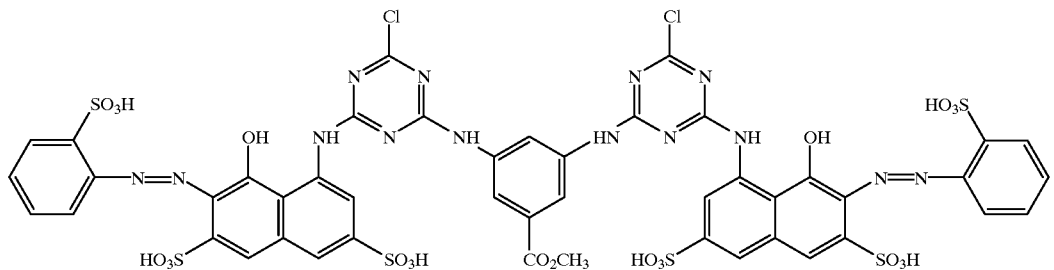
(II-4)

present in 1% to 85% by weight.

7. A dyestuff of formula (I)

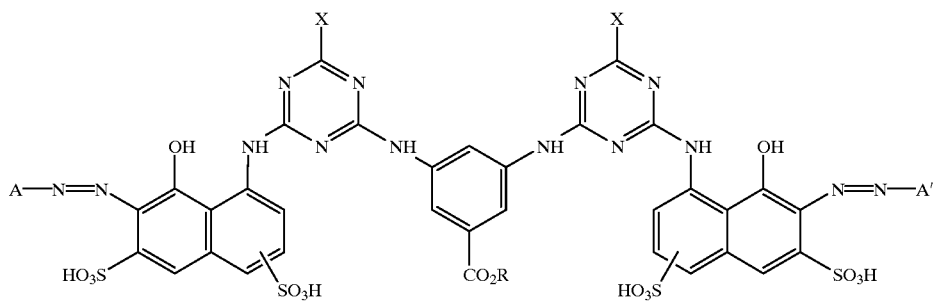
(I)

wherein

R is a hydrogen atom or an alkyl group containing one to four carbon atoms;

X is a fluorine, chlorine or bromine atom;

A and A' are different and each is independently a phenyl or naphthyl group, which may be unsubstituted or substituted by one or more groups selected from, alkyl $C_{1-4}$, alkoxyl $C_{1-4}$ or —$SO_2Q$ where Q is —OH, —CH═$CH_2$, —$C_2H_4OSO_3H$ or —$C_2H_4Cl$.

8. A dyestuff according to claim 7 wherein each X is a chlorine atom.

9. A dyestuff according to claim 7, wherein A and A' are independently selected from either (i) a substituted phenyl sulphonic acid of the following structure,

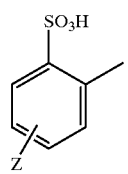

or (ii) a substituted naphthyl sulphonic acid of the following formula,

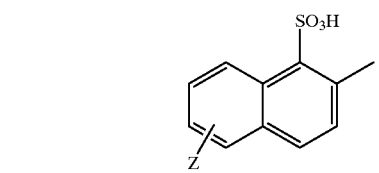

wherein Z is H, $C_{1-4}$ alkyl, $C_{1-4}$ alkoxyl or —$SO_2Q$ where Q is —OH, —CH═$CH_2$, —$C_2H_4OSO_3H$ or —$C_2H_4Cl$.

10. A dyestuff according to claim 7, wherein A is the following substituted phenyl sulphonic acid,

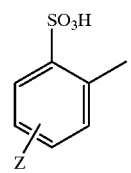

wherein Z is H, $C_{1-4}$ alkyl, $C_{1-4}$ alkoxyl or —$SO_2Q$ where Q is —OH, —CH═$CH_2$, —$C_2H_4OSO_3H$ or —$C_2H_4Cl$; and A' is the following substituted naphthyl sulphonic acid,

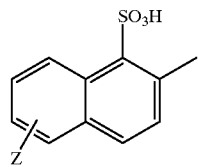

wherein Z is H, $C_{1-4}$ alkyl, $C_{1-4}$ alkoxyl or $-SO_2Q$ where Q is $-OH$ $-CH=CH_2$, $-C_2H_4OSO_3H$, or $-C_2H_4Cl$.

11. A dyestuff of claim 7, wherein said formula (I) is the following structure (I-1).

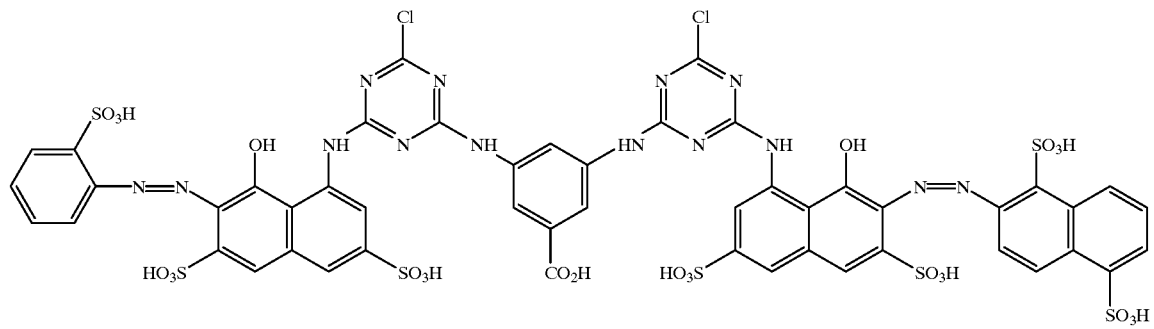

(I-1)

12. A dyestuff according to claim 7, wherein the said formula (I) is a dyestuff of the formula (I-2).

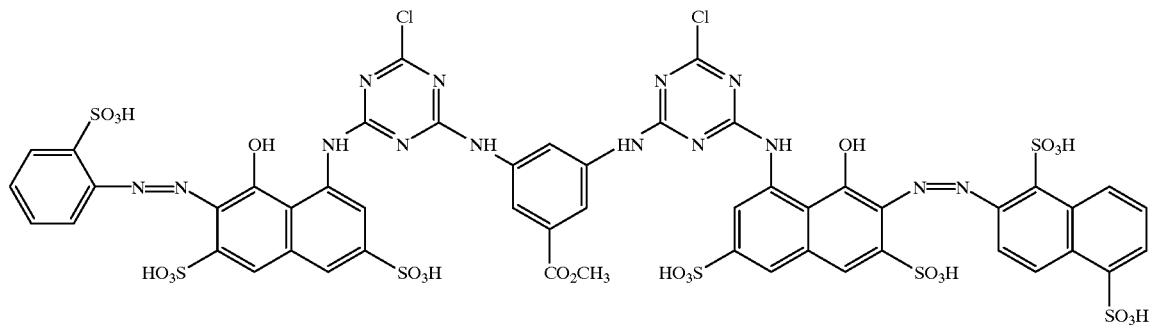

13. A process for preparing the mixture of claim 1, which comprises the following steps:

A) 1-amino-8-hydroxynaphthyl-disulfonic acid is reacted with the following trihalogentriazine of formula (a),

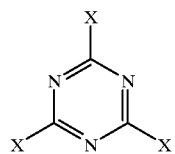

(a)

wherein X is fluorine, chlorine or bromine atom, to get the following formula (b) intermediate,

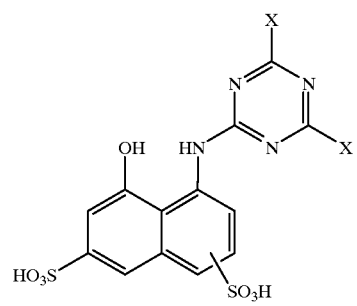

(b)

wherein X is defined as the above;

B) a mixture of the diazonium salts derived from A—NH$_2$ and A'—NH$_2$, wherein A and A' are defined as the above, are reacted with an intermediate represented by formula (b) to give a mixture solution containing compounds of formula (c) and (d);

(c)
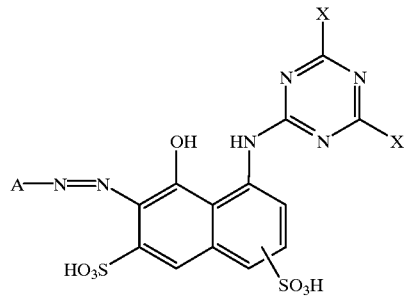

(d)
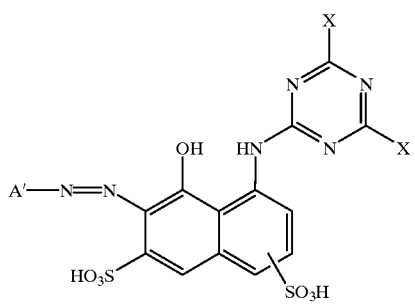

wherein X, A and A' are defined as the above; and

C) the above mixture, in solution, is reacted with 3,5-diaminobenzoic acid or methyl 3,5-diaminobenzoate to give a solution containing dyes represented by the formula (I), (II) and (II').

14. A process according to claim 13, wherein X is a chlorine atom.

15. A process according to claim 13, wherein A and A' are the following substituted phenyl sulphonic acid,

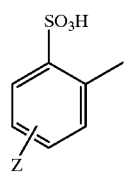

or the following substituted naphthyl sulphonic acid

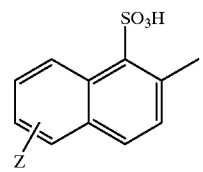

wherein Z is H, $C_{1-4}$ alkyl, $C_{1-4}$ alkoxyl or —$SO_2Q$, where Q is —OH —CH=$CH_2$, —$C_2H_4OSO_3H$, or —$C_2H_4Cl$.

16. A process according to claim 13 wherein A is the following substituted phenyl sulphonic acid,

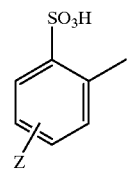

wherein Z is H, $C_{1-4}$ alkyl, $C_{1-4}$ alkoxyl or —$SO_2Q$ where Q is —OH —CH=$CH_2$, —$C_2H_4OSO_3H$ or —$C_2H_4Cl$; and A' is the following substituted naphthyl sulphonic acid,

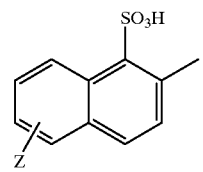

wherein Z is defined as the above.

17. A process for the coloration of cellulosic and amide containing fabrics and fibres, or blends of these with other fibres, which comprises reacting the said fabric or fibre with the red reactive dye mixture as claimed in claim 1 in the presence of heat and alkali.

* * * * *